(12) United States Patent
Furfaro

(10) Patent No.: US 10,576,710 B2
(45) Date of Patent: Mar. 3, 2020

(54) COMPOSITE BREATHING CLOTH FOR SPORTING GARMENTS

(71) Applicant: T.M.F. S.N.C. DI TURRINI PATRIZIA & C., Villafranca (Verona) (IT)

(72) Inventor: Demis Furfaro, Verona (IT)

(73) Assignee: T.M.F. S.N.C. Di TURRINI PATRIZIA & C., Verona (IT)

( * ) Notice: Subject to any disclaimer, the term of this patent is extended or adjusted under 35 U.S.C. 154(b) by 1171 days.

(21) Appl. No.: 14/783,434

(22) PCT Filed: Apr. 15, 2014

(86) PCT No.: PCT/EP2014/001001
§ 371 (c)(1),
(2) Date: Oct. 9, 2015

(87) PCT Pub. No.: WO2014/177251
PCT Pub. Date: Nov. 6, 2014

(65) Prior Publication Data
US 2016/0052232 A1    Feb. 25, 2016

(30) Foreign Application Priority Data

Apr. 18, 2013   (IT) .............................. MO2013A0103

(51) Int. Cl.
*B32B 5/24*    (2006.01)
*B32B 5/06*    (2006.01)
(Continued)

(52) U.S. Cl.
CPC ................ *B32B 5/245* (2013.01); *B32B 5/02* (2013.01); *B32B 5/06* (2013.01); *B32B 5/26* (2013.01);
(Continued)

(58) Field of Classification Search
CPC .. B32B 5/245; B32B 7/12; B32B 5/06; B32B 5/02; B32B 7/08; B32B 5/26; B32B 2307/724; B32B 2262/0276; B32B 2307/51; B32B 2307/56; B32B 2307/72; B32B 2307/304; B32B 2437/00; A41D 1/084; A41D 13/0537
See application file for complete search history.

(56) References Cited

U.S. PATENT DOCUMENTS 4,280,342 A    7/1981   Eng et al.
5,271,101 A *  12/1993  Speth ..................... A41D 1/084
                                                        2/214

(Continued)

*Primary Examiner* — David Sample
*Assistant Examiner* — Donald M Flores, Jr.
(74) *Attorney, Agent, or Firm* — John Alumit

(57) ABSTRACT

Composite breathing cloth for sporting garments that comprises at least one layer having a yarn construction and that is provided with a multiplicity of filaments joining two upper and lower layers of said intermediate portion; said yarn construction being applied to upper and lower fabric layers constituting the cloth, by gluing and/or thermobonding and/or stitching. The cloth is suitable for the construction of bottoms for cycling shorts. Between the upper and/or lower layers of fabric and the yarn construction layer, one or more layers of foam can also be inserted, according to the methods already adopted in the prior art for constructing bottoms.

5 Claims, 1 Drawing Sheet

(51) Int. Cl.
*B32B 7/08* (2019.01)
*B32B 5/02* (2006.01)
*B32B 7/12* (2006.01)
*B32B 5/26* (2006.01)
*A41D 13/05* (2006.01)
*A41D 1/084* (2018.01)

(52) U.S. Cl.
CPC .............. *B32B 7/08* (2013.01); *B32B 7/12* (2013.01); *A41D 1/084* (2013.01); *A41D 13/0537* (2013.01); *B32B 2262/0276* (2013.01); *B32B 2307/304* (2013.01); *B32B 2307/51* (2013.01); *B32B 2307/56* (2013.01); *B32B 2307/72* (2013.01); *B32B 2307/724* (2013.01); *B32B 2437/00* (2013.01)

(56) References Cited

U.S. PATENT DOCUMENTS

| | | | | |
|---|---|---|---|---|
| 6,171,679 B1* | 1/2001 | Wen | ............................ | B32B 5/26 428/112 |
| 6,918,140 B1* | 7/2005 | Cooper | .................. | A41D 1/084 2/228 |
| 2005/0066423 A1* | 3/2005 | Hogan | .................. | A41D 1/084 2/227 |
| 2006/0048282 A1* | 3/2006 | Africa | .................... | A41D 1/084 2/267 |
| 2007/0226869 A1* | 10/2007 | Maier | .................... | A41D 1/084 2/69 |

* cited by examiner

COMPOSITE BREATHING CLOTH FOR SPORTING GARMENTS

TECHNICAL FIELD

The present invention relates to the field of sporting garments. The invention relates to a breathing cloth that is useful for making parts, components or accessories of garments used in sporting disciplines, where a shock-absorbing and protective response is required to shocks and rubbing, particularly repetitive shocks and rubbing. In particular, the invention relates to garments used in the cycling field, such as shorts, bib shorts, leggings and suchlike.

BACKGROUND ART

The object of the present invention is to provide for the prior art with a soft and breathing composite cloth with structural features that are such as to be advantageously used to make bottoms, i.e. that portion of garment that is arranged in the crotch zone of the garment and acts as a shock-absorbing and protecting device in contact with the saddle of a bicycle. In one embodiment of the present embodiment, the composite breathing cloth comprises at least one layer of fabric with a yarn construction, i.e. that is provided with a multiplicity of filaments that join the two upper and lower layers of said fabric so that it is suitable for acting as a shock-absorbing, insulating and breathing air cushion (which is located between the filaments).

Said objects and advantages are all achieved by the composite breathing cloth for sporting garments, that is the object of the present invention, that is characterised by what is set out in the claims below.

BRIEF DESCRIPTION OF DRAWINGS

This and further characteristics of the invention will be better highlighted in the following description of some embodiments thereof, illustrated, in the form of a non-limiting example, with the help of accompanying drawings.

DESCRIPTION OF THE INVENTION

Figure 1:
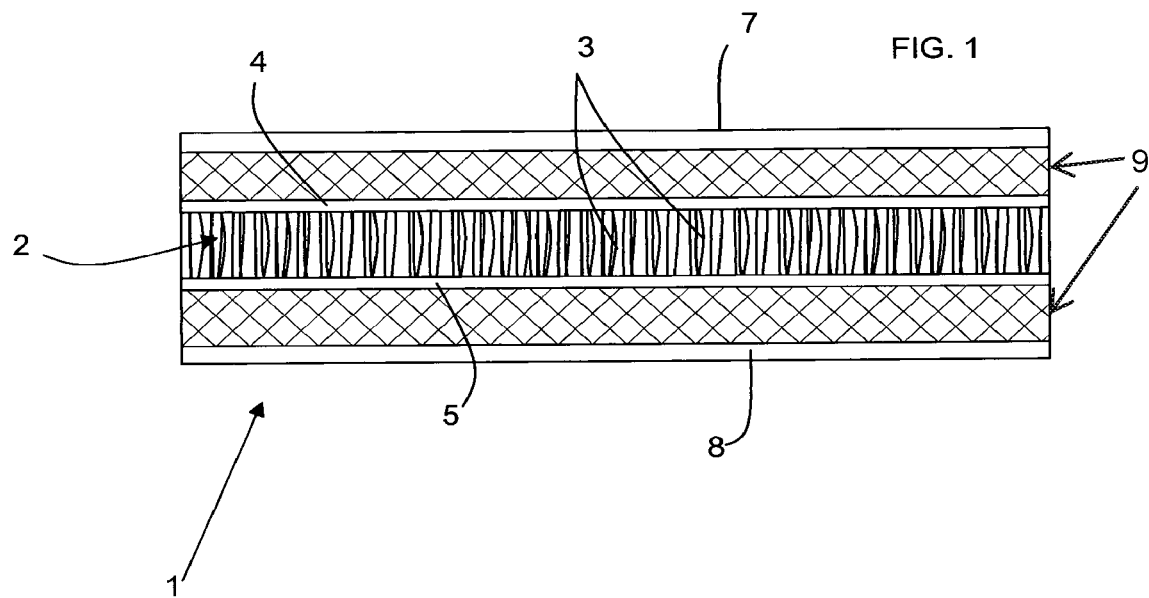
FIG. 1: this shows schematically a section of the cloth in question.
Figure 2:
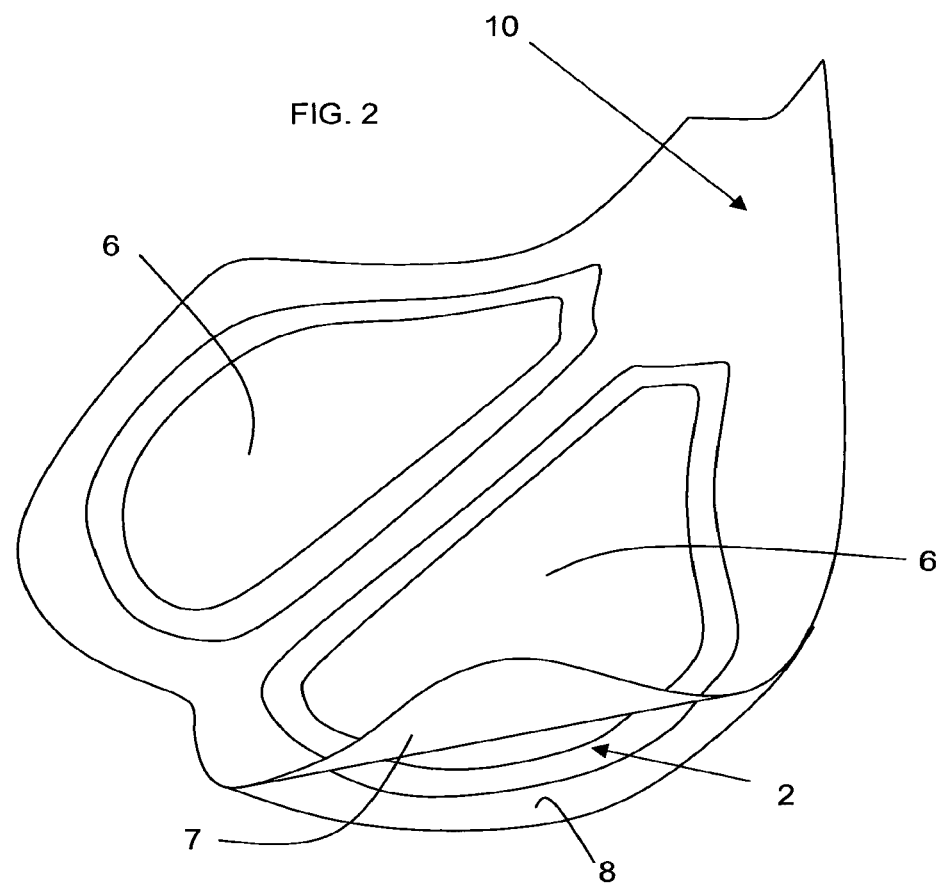
FIG. 2: this shows schematically a bottom for sporting garments made of a composite cloth according to the invention; the bottom is applicable to cycling shorts or similar garments.

With particular reference to the figure, with 1 overall a composite cloth according to the present invention is shown; the cloth comprises internally at least one layer 2, which is preferably but not exclusively intermediate in the section of the composite cloth, having a yarn construction, i.e. provided with a multiplicity of filaments 3 joining a further two layers 4 and 5 that are respectively above and below said intermediate portion.

In fact, the filaments 3 are arranged substantially perpendicular to said upper 4 and lower 5 layers and are uniformly distributed so as to define a certain density per area unit; where the filaments are not present, an insulating layer of air is interposed that ensures the breathability and thermoregulation of the fabric, obtaining the aforementioned benefits. Applying the intermediate layer with a yarn construction with layers 7, 8 of (upper and lower) fabric constituting the cloth is achieved by conventional techniques such as, for example, gluing, thermobonding and stitching.

Said intermediate layer with a yarn construction will be preferably placed in those zones 6 with greater compression, preferably the ischial, perineal and prostatic zones, where such terms refer to the configuration of shorts or of a sporting garment having a bottom affording greater protection and support for said zones.

Between the layers 7, 8 and the layer 2 with a yarn construction, Hone or more foam layers 9 can be inserted according to the same methods already adopted in the known art of the construction of the bottoms. The features of the intermediate layer with a yarn construction are shown:

thickness: from 4 mm to 10 millimetres (mm)

preferably with a composition that is 100% polyester or alternatively a mixed composition elasticity that is 5 to 30% in length and 5 to 25% in width density, comparable to a foam: from 20 kg/m$^3$ to 120 kg/m$^3$ compression: from 2.0 kilopascal to 18 kilopascal.

Owing to the use of this intermediate layer 2 with a yarn construction it is possible to obtain the same absorbent effect combined with greater breathability and comfort.

It has in fact been found that whereas traditional bottoms 10 provided with only foam retain residual humidity that is about 23-32%, with the bottom consisting of the breathing cloth with a layer having a yarn construction, humidity is around 8-13%, enhancing comfort and bringing greater health benefits to the user.

Cloth with a yarn construction, when it is shaped into a bottom for cycling shorts, will have the layer with a yarn construction in the critical resting points (ischiatic, perineal and prostatic zone) and the choice of insertion of one or more further foam layers will depend on the shock-absorbing degree desired.

The invention claimed is:

1. A Composite breathing cloth (1) for sporting garments characterised in that it comprises at least one layer (2) having a yarn construction and being provided with a multiplicity of filaments (3) joining an upper layer (4) and a lower layer (5) of said at least one layer having a yarn construction; said yarn construction layer, upper layer (4), and lower layer (5) being enclosed by an upper fabric layer (7) and a lower fabric layer (8) constituting the composite breathing cloth, by gluing, thermobonding and/or stitching wherein said yarn construction layer has:

thickness between 4 mm to 1 mm composition 100% polyester or alternatively mixed composition elasticity that is 5 to 30% in length and 5 to 25% in width density from 20 kg/m$^3$ to 120 kg/m$^3$, and compression: from 2.0 kilopascal to 18 kilopascal.

2. The composite breathing cloth of claim 1 being in the form of a garment bottom for cycling shorts (10) wherein said at least one layer (2) having a yarn construction is disposed in ischiatic, perineal, and prostatic zones of said garment bottom for cycling shorts.

3. The breathing cloth according to claim 1, wherein said filaments (3) are arranged substantially perpendicular to the two upper and lower layers (4, 5) and are distributed uniformly, thus defining a density per area unit; where the filaments are not present, an insulating air layer is interposed that ensures breathability and thermobonding.

4. The breathing cloth according to claim 1, characterised in that the yarn construction layer is in an intermediate section of the composite cloth.

5. The breathing cloth according to claim 1, characterised in that the yarn construction layer is interposed between further layers of the composite cloth; said layers consisting of foam (9).

* * * * *